Patented Nov. 25, 1952

2,619,472

UNITED STATES PATENT OFFICE 2,619,472

FLUORESCENT COATING METHOD

Herman R. Schoenfeldt, South Euclid, Ohio, assignor to General Electric Company, a corporation of New York No Drawing. Application May 2, 1950,
Serial No. 159,643

2 Claims. (Cl. 252—301.4)

My invention relates to improvements in fluorescent coatings for electric discharge lamps.

The now well known fluorescent lamps comprise an elongated tubular envelope having electrodes sealed into the ends thereof and containing a gaseous atmosphere which may be a mixture of a rare gas and mercury. The interior surface of the envelope is coated with a finely divided fluorescent material which is excited to luminescence by ultraviolet radiations emitted by the discharge. Although various coating methods have been employed, including electrostatic precipitation of the powder onto the surface of the tube, the powder is usually applied by suspending it in a suitable binder of cellulosic ester, such as a solution of nitrocellulose in amyl acetate, flushing the interior of the envelope with the suspension, permitting the excess solution to drain out of the tube and then firing at a temperature of some 400–600° C. to burn out the binder.

The fluorescent powders principally employed heretofore have been the silicates and tungstates, principally manganese-activated zinc beryllium silicate and magnesium tungstate. However, recently these powders have been replaced by halophosphate phosphors such as those disclosed in Patent 2,488,733, McKeag et al., and particularly the composition consisting of calcium chloro-fluoro-phosphate activated with antimony and manganese. While the halophosphate phosphors possess certain distinct advantages, it has been found that they do not adhere as firmly to the surface of the glass envelope, particularly when the coated envelope is reheated and reshaped, as in the manufacture of sign tubing and circular lamps. Apparently elongation, compression and expansion of the glass tube in the process of reshaping it break the phosphor-to-phosphor and phosphor-to-glass bond. In such cases the problem is so acute as to make it virtually impossible to manufacture acceptable tubes due to the excessive flaking-off of the phosphor particles.

It is an object of the present invention to provide a method of improving the adherence of phosphors of the halophosphate type without unduly affecting other characteristics such as brightness and lumen maintenance.

In accordance with my invention, halophosphate phosphors are made to adhere firmly to a glass surface by a preliminary treatment wherein the powdered phosphor is mixed with a small amount of boric acid and fired at an elevated temperature preferably in excess of 700° C. but less than 1000° C. The firing of the mixture prior to application to the glass surface is an essential step of my improved process. Subsequently the treated phosphor is applied to the glass surface in any desired manner, preferably by means of a suspension of the phosphor in a solution of cellulosic ester as described above, followed by baking to burn out the binder. It is not enough to merely add the boric acid to the suspension as has been proposed heretofore for other phosphors. In general, I prefer to employ as small an amount of boric acid as will insure good adherence inasmuch as excessive amounts tend to cause a loss in brightness of the phosphor. I have found that amounts of boric acid in the range of about .05 to 3 per cent by weight of the phosphor have given good results, particularly amounts of about .7 per cent. I have also found that the firing temperature of the mixture of phosphor and boric acid should preferably exceed 700° C. but that it must not exceed 1000° C. inasmuch as higher temperatures result in fusion and sintering of the phosphor. The firing time is not critical. I have obtained good results by firing for about two hours at a temperature of about 900° C.

As an example of the process comprising my invention, the powdered phosphor, of calcium chloro-fluoro-phosphate activated with antimony and manganese for example, is mixed with .7 per cent by weight of boric acid. The dry mixture is milled for about one-half hour and then fired in a covered silica tray at a temperature of about 900° C. for two hours. Subsequently, the treated phosphor is suspended in a solution of nitrocellulose in amyl acetate. A coating of the suspension is applied to the interior of the glass lamp envelope and, after drying, the envelope is baked at a temperature of approximately 400–600° C. to burn out the binder.

In tubes so treated the coating particles adhere firmly to each other and to the glass wall and are not dislodged by movement of mercury across the coated surface nor by heating and reshaping of the tube. The treatment effects changes in the physical, chemical and luminescent properties of the phosphor. For example, the powder is bulkier, and the spectral distribution is shifted somewhat.

What I claim as new and desire to secure by Letters Patent of the United States is:

1. The method of improving the adherence of a coating of finely divided particles of a halophosphate phosphor to a glass surface which comprises the preliminary step, prior to application of the phosphor to the said surface, of mixing the phosphor with about .05 to 3 per cent by weight of boric acid and firing the mixture at an elevated temperature between 700 and 1000° C.

2. The method of improving the adherence of a coating of finely divided particles of a calcium chloro-fluoro-phosphate phosphor to a glass surface which comprises the preliminary step, prior to application of the phosphor to the said surface, of mixing the phosphor with about .05 to 3 per cent by weight of boric acid and firing the mixture at an elevated temperature of about 900° C.

HERMAN R. SCHOENFELDT.

REFERENCES CITED

The following references are of record in the file of this patent:

UNITED STATES PATENTS

| Number | Name | Date |
|---|---|---|
| 2,298,968 | Roberts et al. | Oct. 13, 1942 |
| 2,344,081 | Claude | Mar. 14, 1944 |
| 2,488,733 | McKeag et al. | Nov. 22, 1949 |